United States Patent Office 3,452,966
Patented July 1, 1969

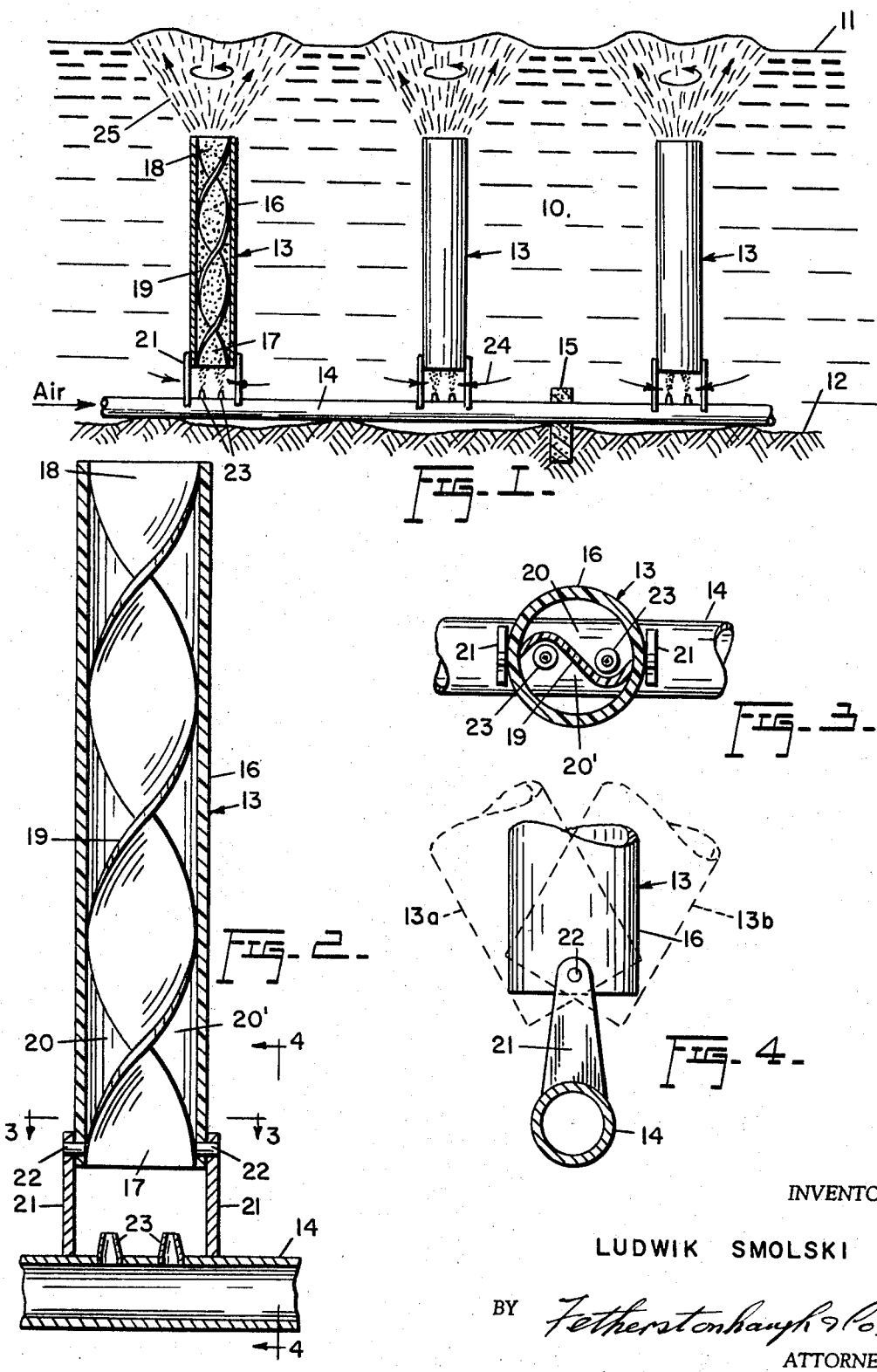

3,452,966
LIQUID TREATMENT APPARATUS
AND METHOD
Ludwik Smolski, Montreal, Quebec, Canada, assignor to Polcon Corporation, Montreal, Quebec, Canada
Filed Aug. 24, 1967, Ser. No. 663,005
Int. Cl. B01d 47/02
U.S. Cl. 261—77        10 Claims

ABSTRACT OF THE DISCLOSURE

Treatment of liquid such as water by circulation and aeration. An open-ended vertical tube is submerged in the liquid with its lower end above a gas bubble generator which produces an upward flow of bubble-laden liquid through the tube. A helical baffle is provided in the tube to create turbulence in the bubble-laden liquid and assist in breakdown of bubbles and absorption of gas into the liquid. The baffle also imparts rotational movement to the liquid, which discharges through the upper end of the tube with a vortex-like action in the liquid stratum between the upper end of the tube and the liquid level.

---

This invention relates to new and useful improvements in the art of liquid treatment, such as fresh water city systems, rivers, lakes, and particularly in bays, pools, or the like, where there is no natural flow or circulation to prevent stagnation. This liquid treatment is effected by discharging bubbles of air into the lower end of a vertical tube submerged in the liquid, so as to produce an upward flow of bubble-laden liquid which results in circulation and aeration of the liquid medium. As such, the liquid treatment of the invention is also applicable to other uses, as for example, in bioligical treatment of liquid waste or sewage where adequate circulation and aeration are essential for effective carrying out of bacterial synthesis of dissolved pollutional organic matter into new protoplasm. Also, in other environments, the treatment by circulation and aeration may be used for destratifying liquids in tanks or reservoirs, preventing ice formation on bodies of water, attenuating waves in shipping channels or near docks, providing oxygen for fish, et cetera, wherever a gas-liquid contact is involved for absorption of gas into and circulation of liquid.

The principal object of the invention is to provide a highly improved apparatus and method for liquid treatment of the aforementioned general type wherein bubbles of gas are discharged into a submerged tube to produce circulation and aeration of the liquid, the apparatus and method of the invention being much more efficient in operation as compared to prior art, particularly from the standpoint of a highly effective gas-liquid contact which facilitates a higher and more rapid absorption of gas into the liquid than has heretofore been possible.

This object is attained primarily by placing a helical baffle longitudinally in the submerged tube so that the bubble-laden liquid follows a tortuous passage through the tube and considerable turbulence is created within that passage to assist in compression and breakdown of bubbles and rapid absorption of gas into the liquid.

Another important object of the invention, considered in conjunction with the principal object, is to also utilize the helical baffle for imparting a rotating movement to the liquid flowing through the tortuous passage, so that the liquid discharged from the tube has an upwardly widening vortex-like action in the stratum between the tube and the liquid level. This action serves not only to mix the released gas with a larger volume of liquid, but also by increasing the total flow of liquid to the surface to absorb additional air from above the level of the liquid.

Another object of the invention is to further increase the operating efficiency of the baffle-equipped tube by arranging the baffle so that it transversely separates the tube into two juxtaposed helical passages, and providing a bubble generator which includes a pair of bubble emitting jets, aligned with and discharging bubbles into the respective passages of the tube.

Still another object of the invention is to provide novel mounting means for the baffle-equipped tube or tubes, if several tubes are used in series or parallel, such mounting means pivotally connecting lower ends of the tubes to a submerged air-carrying conduit on which the bubble generators are provided. The tubes are normally biased to a vertical position by their inherent buoyancy, but their pivotal mounting means permits them to swing in vertical planes if they should be contacted by boats, floating debris or other obstruction, thus enabling the tubes to clear the obstruction and safe guarding against possible damage.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a view, partly in elevation and partly in vertical section, showing the apparatus of the invention submerged in a body of water;

FIG. 2 is a fragmentary, enlarged vertical sectional view of one of the baffle-equipped tubes with its mounting means and bubble generator on the air-carrying conduit;

FIG. 3 is a fragmentary horizontal sectional view, taken substantially in the plane of the line 3—3 in FIG. 2; and FIG. 4 is a fragmentary vertical sectional view, taken substantially in the plane of the line 4—4 in FIG. 2.

Referring now to the accompanying drawings in detail, the liquid circulating and aerating apparatus of the invention is shown in FIG. 1 as being submerged in a body of water 10, which may be a river, a bay, a lake, a natural or artificial reservoir, or any other body of liquid which is to be treated. The normal liquid level is indicated at 11, while the bottom or bed of the liquid is indicated at 12.

The circulating and aerating apparatus of the invention comprises at least one tube assembly 13 which is submerged vertically in the liquid body 10 for coaction with a bubble generator provided on an air-carrying conduit 14, as will be hereinafter described. As a practical matter, several of the tube assemblies 13 may be used in series or parallel, so to speak, on the same conduit 14, depending upon the area or volume of liquid to be treated. The conduit 14 receives a supply of air from any suitable source such as a pump or blower (not shown). The conduit may simply rest on the bed 12, or it may be anchored thereto at longitudinally spaced points by any suitable means exemplified by the anchor block 15. Also, if the body of liquid has substantial depth, the conduit may be suitably supported at some elevation above the bed 12, as long as the apparatus is submerged in the liquid body as already stated.

One of the tube assemblies 13 is shown in detail in FIGS. 2 and 3, from which it will be apparent that the assembly comprises a vertical, open-ended tube 16 having an inlet 17 and an outlet 18 at the respective lower and upper ends thereof. A helical baffle 19 is suitably secured in and extends longitudinally in the tube 16. As will be apparent from FIG. 3, the baffle 19 transversely spans the tube, so as to divide the tube into a pair of juxtaposed helical, tortuous passages 20, 20', open at both ends of the tube. The baffle preferably has a reversely curved or reverse S-shaped cross-section as shown in FIG. 3, to assist in agitation of fluid passing through the tube, as hereinafter explained.

The tube assembly 13 is mounted on the air-carrying conduit 14 by a pair of upstanding brackets 21 which are secured to the conduit and have their upper ends connected to the lower end portion of the tube by a pair of diametrically opposite pivot pins 22, so that the tube assembly is capable of swinging in a vertical plane about the axis of the pivot pins, as indicated by the dotted lines 13a, 13b in FIG. 4. The tube 16 and the helix 19 are made of light-weight material such as plastic, for example, so that the tube assembly is inherently buoyant in the liquid 10 and is thus normally buoyantly biased to its vertical position. However, if the tube should be contacted by passing boats, floating debris or some other obstruction, it is free to swing on the pivot pins 22 to a slanting position for clearing the obstruction and preventing possible damage to the tube. The buoyant bias of the tube to its vertical position is further assisted by flow of air and water upwardly through the tube, as will be presently described.

The air conduit 14 is provided below each tube assembly with a bubble generator which preferably consists of a pair of air bubble emitting jets 23 of any suitable construction, disposed on top of the conduit as shown, so that they are in alignment with and capable of discharging air bubbles into the lower end of the helical passages 20, 20' in the tube assembly 13. The two jets cooperate with the two passages respectively, one jet discharging bubbles into the passage 20 and the other jet into the passage 20'. as will be apparent from FIG. 3.

The jets 23 are located between the tube mounting brackets 21, but otherwise the inlet 17 of the tube is unobstructed, so that when the jets are in operation, surrounding water may enter the inlet of the tube as indicated at 24 in FIG. 1 to produce a flow of water and air bubbles upwardly through the tortuous passages 20, 20', for discharge into the body of water through the outlet 18 at the upper end of the tube, thus resulting in circulation of the liquid.

At the same time, the air bubbles become compressed and broken down by the liquid, and the released air is absorbed by the liquid so that aeration of the liquid is obtained. However, it is to be particularly noted that if the tortuous passages 20, 20' provided by the helical baffle 19 were not present, the bubble-laden water would travel rapidly through the tube to the surface of the water where many of the air bubbles would be released into the atmosphere and aeration of the water would thus be far less efficient. On the other hand, the tortuous passages provided by the helical baffle in the tube create substantial agitation and turbulence in the bubble-laden water, so that compression and breakdown of the bubbles and resultant aeration are much more efficient. Moreover, the tortuous passages cause the bubble-laden water to travel a longer distance through the tube as compared to a tube with a straight-through passage, with the result that the compression and breakdown of bubbles takes place earlier or at a lower level in the tube, and more time and traveling distance are afforded for effecting more complete aeration.

The tube assembly 13 may be mounted so that the outlet 18 of the tube is close to the normal water level 11, but preferably the mounting is such that the tube outlet 18 is spaced substantially downwardly from the water level, as by a distance corresponding more-or-less to one-half the length of the tube. In addition to providing the tortuous passages for purposes already explained, the helical baffle 19 also serves to impart a rotational movement to the liquid flowing upwardly through the tube, and when this rotating liquid is discharged through the tube outlet 18, it produces an upwardly widening, vortex-like action in the stratum of liquid between the tube outlet and the liquid level, as indicated at 25. This action not only spreads the aerating effect through a larger volume of surrounding water, but also draws in an additional volume of air from the atmosphere by the turbulence created at the water level.

The apparatus and method of the invention may be employed for circulating and aerating water in rivers, lakes, reservoirs, et cetera where there is little or no natural flow to prevent stagnation. Also, it may be used in such bodies of water or in tanks for providing an adequate supply of oxygen for fish, and it may also be employed in carrying out chemical or physical procedures where an effective gas-liquid contact is desirable or necessary.

Additionally, the apparatus and method of the invention may be particularly useful in the biological treatment of liquid waste or sewage, where dissolved pollutional organic matter is removed from the waste by bacterial synthesis into new protoplasm, the organic matter being food for micro-organisms while oxygen is necessary as a source of energy to assimilate the food. In such an environment the micro-organisms can carry out their function effectively if sufficient oxygen is provided to achieve optimum process rates and if turbulent mixing exists to bring the food and the micro-organisms into intimate contact. Conventional devices employed for aerating and mixing were either turbine type surface aerators which do not provide effective action except in the immediate upper stratum near the liquid level, or bubble generators near the bottom of the liquid body, in which instance air bubbles rising freely and quickly to the surface do not permit effective absorption and aeration to take place.

By comparison, the invention affords a highly efficient intimate contact of bubbles and liquid flowing turbulently through the tortuous passages from the bottom to the top of the tube, surmounted by the additional turbulence of the vortex-like action in the surface stratum above the tube, so that effective aeration and circulation is attained throughout the body of liquid.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In an apparatus for circulating and aerating a body of liquid, the combination of an open-ended tube submerged substantially vertically in a body of liquid to be treated, said tube having an inlet and an outlet at the respective lower and upper ends thereof, a helical baffle extending longitudinally in said tube and providing two separate tortuous passages therein, and a gas bubble generator disposed below the lower end of the tube for discharging bubbles into the inlet end of the two separate passages in the said tube inlet whereby to produce an upward flow of liquid and bubbles through said tortuous passages for discharge into the liquid body through said tube outlet, said helical baffle creating substantial turbulence in the bubble-laden liquid flowing upwardly through said tortuous passages, whereby to materially assist in compression and breakdown of bubbles and absorption of gas into the liquid.

2. The apparatus as defined in claim 1 wherein said tube is submerged in the body of liquid so that the tube outlet is spaced downwardly from the liquid level, said helical baffle imparting rotational movement to the liquid discharged through said tube outlet, whereby the discharging liquid has an upwardly widening vortex-like action in the stratum between the tube outlet and the liquid level.

3. The apparatus as defined in claim 1 wherein said helical baffle transversely spans said tube and divides the same into a pair of juxtaposed helical passages separated from each other by said baffle, said passages constituting said tortuous passage means, together with a submerged gas carrying conduit having said bubble generator provided thereon, and means mounting said tube on said conduit above said bubble generator, said generator including a pair of bubble emitting jets provided on said conduit, one of the jets of the pair being in alignment with one of the helical passages and the other of the jets being in alignment with the other of the helical passages.

4. The apparatus as defined in claim 1 wherein said helical baffle transversely spans said tube and divides the same into a pair of juxtaposed helical passages separated from each other by said baffle, said passages constituting said tortuous passages.

5. The apparatus as defined in claim 4 wherein said gas bubble generator includes a pair of bubble emitting jets disposed below the tube inlet, one of the jets of the pair being in alignment with one of the helical passages and the other of the jets being in alignment with the other of the helical passages.

6. The apparatus as defined in claim 1 together with a submerged gas carrying conduit having said bubble generator provided thereon, and means mounting said tube on said conduit above said bubble generator.

7. The apparatus as defined in claim 6 wherein said tube mounting means include pivot means permitting swinging movement of the tube in a vertical plane.

8. The apparatus as defined in claim 7 wherein said tube with said baffle are buoyant and are buoyantly biased on said pivot means to a substantially vertical position.

9. A method for circulating and aerating a body of liquid, said method comprising the steps of submerging in the liquid an open-ended substantially vertical tube having at least a pair of juxtaposed helical passages, discharging bubbles of gas into the lower end of the tube so as to produce two separate upward flows of liquid and bubbles through the tube, and causing the bubble-laden liquid to follow a tortuous passage through the helical passages of the tube, whereby to create substantial turbulence for assisting in breakdown of bubbles and absorption of gas into the liquid.

10. The method as defined in claim 9 wherein said step of submerging said tube includes placing the tube so that its upper end is spaced downwardly from the liquid level, said step of causing the bubble-laden liquid to follow a tortuous passage through the tube including the imparting of rotational movement to the liquid, together with the step of discharging the rotating liquid through the upper end of the tube with an inwardly widening vortex-like action in the stratum between the upper end of the tube and the liquid level.

References Cited
UNITED STATES PATENTS

| | | | |
|---|---|---|---|
| 653,677 | 7/1900 | Ibert | 261—79.1 |
| 3,032,496 | 5/1962 | Griffith | 210—14 |
| 3,194,756 | 7/1965 | Walker | 210—14 |
| 3,276,698 | 10/1966 | Wood | 210—14 X |
| 3,233,389 | 2/1966 | Dahlen | 261—79.1 X |

MICHAEL E. ROGERS, *Primary Examiner.*

U.S. Cl. X.R.

61—1, 6; 119—3; 210—14, 197, 220; 261—123, 124